J. MALLIN.
Flour-Bolt Feeder.
No. 92,070.
Patented June 29, 1869.
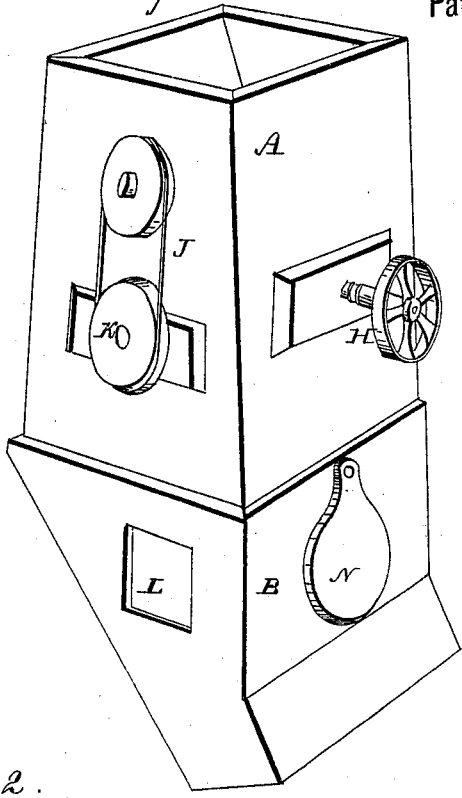
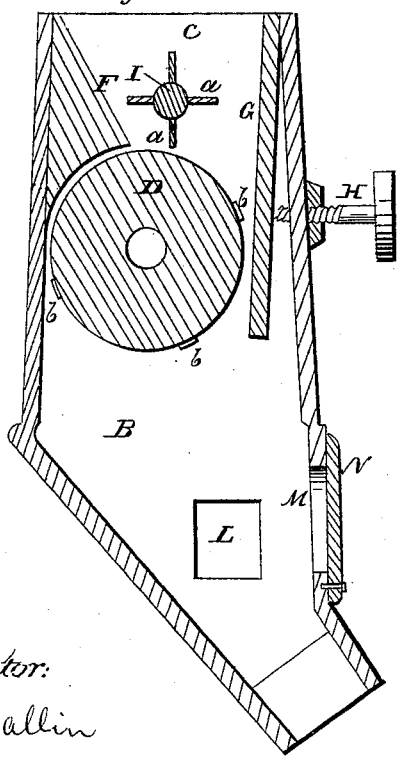
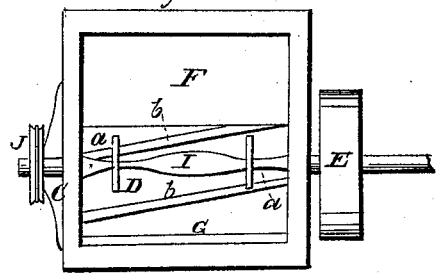
Inventor:
J. Mallin
Witnesses:
J. H. Burridge
E. E. White

United States Patent Office.

JOHN MALLIN, OF CHICAGO, ILLINOIS.

Letters Patent No. 92,070, dated June 29, 1869.

---

IMPROVEMENT IN FLOUR-BOLT FEEDERS.

---

The Schedule referred to in these Letters Patent and making part of the same.

---

*To all whom it may concern:*

Be it known that I, JOHN MALLIN, of Chicago, in the county of Cook, and State of Illinois, have invented certain new and useful Improvements in Flour-Bolt Feeders; and I do hereby declare that the following is a full and complete description of the same, reference being had to the accompanying drawings, making a part of this specification, in which—

Figure 1 is a perspective view of the apparatus.
Figure 2, a vertical transverse section.
Figure 3, a view of the top.

Like letters of reference refer to like parts in the different views.

The nature of this invention relates to an apparatus for feeding meal or middlings into bolting-cloths in the manufacture of flour, the same being used in connection with an ordinary hopper-boy or cooler, as used in flouring-mills, for cooling the meal or flour after being ground.

This apparatus consists of a wooden case, constructed in two sections, A B, fig. 1, of which A is the upper section, and B, the lower one.

In the upper part of section A is a hopper or receiver, C, fig. 2, into which the meal drops, from a hopper-boy or cooler, previous to its being bolted.

Immediately below said hopper is a roller, D, driven by a pulley, E.

Said roller, on one side, is partially covered by a cant-board, F, whereas the other side of the roller is in close proximity to an adjustable supplementary side, G, said side being hinged, at the top, to the side of the case, while the lower end is free to move toward or from the roller, by means of the adjusting-screw H, to which the supplementary side is attached, and operated as and for a purpose hereinafter shown.

Immediately above the roller is an agitator or breaker, I, said agitator being a shaft, with more or less radial arms, $a$, driven by a pulley and belt, J, from the pulley K, secured to the shaft of the roller D.

The lower section, B, constitutes the spout of the apparatus, in the sides of which are windows, L, for observing the meal as it passes down through the spout.

M, fig. 3, is a hand-hole, in which the hand is inserted for the examination of the meal, and, when not in use, is closed by a cover, N.

Having thus described the construction and arrangement of the feeder, the practical operation of the same is as follows:

The feeder is placed in connection with and immediately under the hopper-boy or cooler, from which the meal or flour passes to the bolt; first, by passing through the feeder, which, as it drops into the hopper C, falls upon the roller D, and is thereby carried to the side G by the cleats, $b$, arranged longitudinally on the face of the roller.

The quantity of flour passed down between the roller and side is regulated by the adjusting-screw H, whereby the hinged supplementary side G is made to approach to or recede from the roller, thereby increasing or lessening the space or passage-way for the descent of the meal to the spout; thence into the bolting-apparatus.

As the meal or flour falls into the hopper, it is stirred up by the revolving agitator I. Hence it cannot lodge in and about the hopper and roller, into which it is continually directed by the cant-board F.

By this device, it will be obvious that the flour from the cooler is fed to the bolt regularly and equally, and in constant and certain quantities, more or less, so that the bolt cannot become overcharged with meal. Hence the process of bolting will be more evenly and perfectly done than it can be in the ordinary way.

The supplementary side G may be operated by a spring arranged in connection therewith, thereby dispensing with the use of the adjusting-screw.

What I claim as my improvement, and desire to secure by Letters Patent, is—

The agitator I, ribbed or cleated roller D, as arranged to operate, conjointly, in combination with the adjustable supplementary side G, and case, consisting of sections A B, all constructed and arranged to operate in the manner substantially as described, and for the purpose set forth.

JOHN MALLIN.

Witnesses:
PETER REYNARD,
HORACE E. ROBINSON.